(12) United States Patent
Wehe et al.

(10) Patent No.: US 12,441,611 B2
(45) Date of Patent: Oct. 14, 2025

(54) METHOD AND APPARATUS FOR OPERATING A VACUUM INTERFACE OF A MASS SPECTROMETER

(71) Applicant: Thermo Fisher Scientific (Bremen) GmbH, Bremen (DE)

(72) Inventors: Christoph Wehe, Bremen (DE); Marcus Manecki, Bremen (DE); Georgina Thyssen, Bremen (DE); Sven Wohlgethan, Bremen (DE); Daniel Precht, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 18/617,503

(22) Filed: Mar. 26, 2024

(65) Prior Publication Data

US 2024/0239653 A1 Jul. 18, 2024

Related U.S. Application Data

(63) Continuation of application No. 17/046,890, filed as application No. PCT/EP2019/058457 on Apr. 4, 2019, now abandoned.

(30) Foreign Application Priority Data

Apr. 13, 2018 (GB) .................. 1806080

(51) Int. Cl.
*H01J 49/06* (2006.01)
*B01J 23/755* (2006.01)
(Continued)

(52) U.S. Cl.
CPC .............. *C01B 3/30* (2013.01); *B01J 23/755* (2013.01); *C01B 3/56* (2013.01); *C01B 32/162* (2017.08);
(Continued)

(58) Field of Classification Search
CPC ........ H01J 49/067; H01J 49/24; H01J 49/105; C01B 3/30; C01B 3/56; C01B 32/162; C01B 2203/0277; B01J 23/755
See application file for complete search history.

(56) References Cited

U.S. PATENT DOCUMENTS

| 5,944,049 A | 8/1999 | Beyer et al. |
| 6,265,717 B1 | 7/2001 | Sakata et al. |

(Continued)

FOREIGN PATENT DOCUMENTS

| CN | 104576289 B | 8/2017 |
| JP | 11185695 A | 9/1999 |

OTHER PUBLICATIONS

International Search Report and Written Opinion dated Sep. 27, 2019, from International Patent Application No. PCT/EP2019/058457, 9 pages.

*Primary Examiner* — Sean M Luck
(74) *Attorney, Agent, or Firm* — Klarquist Sparkman, LLP

(57) ABSTRACT

A method is disclosed for operating a mass spectrometer vacuum interface, the vacuum interface comprising an evacuated expansion chamber downstream of a plasma ion source wherein the expansion chamber is pumped by an interface vacuum pump to provide an interface pressure in the chamber; the method comprising using a controller to automatically, or according to user input, control the throughput of the interface vacuum pump to control the interface pressure dependent on one or more operating modes of the spectrometer.

4 Claims, 3 Drawing Sheets

(51) Int. Cl.
*C01B 3/30* (2006.01)
*C01B 3/56* (2006.01)
*C01B 32/162* (2017.01)
*H01J 49/10* (2006.01)
*H01J 49/24* (2006.01)

(52) U.S. Cl.
CPC .......... *H01J 49/067* (2013.01); *H01J 49/105* (2013.01); *H01J 49/24* (2013.01); *C01B 2203/0277* (2013.01)

(56) References Cited

U.S. PATENT DOCUMENTS

| | | |
|---|---|---|
| 7,303,727 B1 | 12/2007 | Dubrow et al. |
| 8,637,816 B1 | 1/2014 | Mordehai et al. |
| 2005/0269506 A1 | 12/2005 | Kalinitchenko |
| 2011/0071764 A1 | 3/2011 | Prather et al. |
| 2012/0112056 A1 | 5/2012 | Brucker et al. |
| 2013/0032711 A1 | 2/2013 | Ishiguro et al. |
| 2013/0062515 A1 | 3/2013 | Quimby et al. |
| 2013/0175442 A1 | 7/2013 | Yamada et al. |
| 2014/0217280 A1 | 8/2014 | Sugawara |
| 2015/0200083 A1 | 7/2015 | Brown et al. |
| 2016/0027618 A1 | 1/2016 | Kawakami et al. |
| 2016/0126078 A1 | 5/2016 | Liepert et al. |
| 2016/0135277 A1 | 5/2016 | Duimstra et al. |
| 2017/0207075 A1 | 7/2017 | Quarmby et al. |
| 2021/0032101 A1 | 2/2021 | Spanu et al. |

METHOD AND APPARATUS FOR OPERATING A VACUUM INTERFACE OF A MASS SPECTROMETER

CROSS REFERENCE TO RELATED APPLICATIONS

This is a Continuation of U.S. patent application Ser. No. 17/046,890, filed Oct. 12, 2020, which is the U.S. National Stage of PCT Application No. PCT/EP2019/058457, filed Apr. 4, 2019, which claims the benefit of application GB 1806080.6 filed Apr. 13, 2018. All of these prior applications are hereby incorporated by reference in entirety.

FIELD

The invention relates to the field of mass spectrometry and in particular to a method and apparatus for operating a vacuum interface, more particularly, but not exclusively, an atmosphere-to-vacuum interface of a mass spectrometer. The method and apparatus are suitable for use principally with a plasma ion source, such as an inductively coupled plasma (ICP), microwave-induced plasma (MIP), or laser-induced plasma, ion source. The following description will focus on embodiments using inductively coupled plasma mass spectrometry (ICP-MS) for illustration.

BACKGROUND

The general principles of ICP-MS are well known. ICP-MS instruments provide robust and highly sensitive elemental analysis of samples, down to the parts per trillion (ppt) range and beyond. Typically, the sample is a liquid solution or suspension and is supplied to the plasma by a nebulizer in the form of an aerosol in a carrier gas, which is generally argon or sometimes helium. The nebulized sample passes into a plasma torch, which typically comprises a number of concentric tubes forming respective channels and is surrounded towards the downstream end by a helical induction coil. A plasma gas, typically argon, flows in the outer channel and an electric discharge is applied to it, to ionize some of the plasma gas. A radio frequency (RF) electric current is supplied to the helical torch coil and the resulting alternating magnetic field causes the free electrons to be accelerated to bring about further ionization of the plasma gas. This process continues until a steady plasma state is achieved, at temperatures typically between 5,000K-10,000K. The carrier gas and nebulized sample flow through the central torch channel and pass into the central region of the plasma, where the temperature is high enough to cause atomization and then ionization of the sample. The sample ions in the plasma next need to be formed into an ion beam, for ion separation and detection by the mass spectrometer, which may be provided by a quadrupole mass analyser, a magnetic and/or electric sector mass analyser, a time-of-flight mass analyser, or an ion trap mass analyser, among others.

Thus, in ICP-MS, ions are formed under atmospheric pressure or relatively high pressure (e.g. over 100 mbar) outside the main vacuum system of the spectrometer. For most mass analysers, a vacuum having a pressure of $<5 \times 10^{-5}$ mbar is required. An interface region is therefore provided that regulates the transfer from the atmospheric pressure ion source to the high vacuum mass analyser (see FIG. 1, which is described below). This typically involves a number of stages of pressure reduction, extraction of the ions from the plasma and ion beam formation, and may include a collision/reaction cell stage for removing potentially interfering ions from the mass analysis. The first stage of pressure reduction is achieved by sampling the plasma through a first aperture in a vacuum interface, typically provided by a sampling cone having an apertured tip, which typically has an inner diameter in the range 0.5 to 1.5 mm. The sampling cone is the typical component which interfaces with the plasma source at atmospheric, or relatively high (>100 mbar), pressure. The sampled plasma expands downstream of the first aperture into an evacuated expansion chamber, wherein the pressure is typically a few mbar (e.g., 1-10 mbar). The central portion of the expanding plasma then passes through a second aperture, typically provided by a skimmer cone, into a second evacuation chamber having a higher degree of vacuum than the expansion chamber. As the plasma expands through the skimmer cone, its density reduces sufficiently to allow extraction of the ions to form an ion beam, using strong electric fields generated by ion lenses downstream of the skimmer cone. The resulting ion beam may be deflected and/or guided onwards towards the mass spectrometer by one or more ion deflectors, ion lenses, and/or ion guides, which may operate with static or time-varying fields.

A collision/reaction cell may be provided upstream of the mass spectrometer to remove potentially interfering ions from the ion beam. These are typically argon-based ions (such as Ar+, $Ar^{2+}$, $ArO^+$), but may include others, such as ionized hydrocarbons, metal oxides or metal hydroxides. The collision/reaction cell promotes ion-neutral collisions/reactions, whereby the unwanted molecular ions (and $Ar^+$, $Ar^{2+}$) are preferentially neutralized and pumped away along with other neutral gas components, or dissociated into ions of lower mass-to-charge ratios (m/z) and rejected in a downstream m/z discriminating (mass filter) stage. Alternatively, the analyte ions may be preferentially subjected to mass shift reactions such that the resultant mass shifted ions can be separated from the interfering ions in a downstream m/z discriminating stage. U.S. Pat. Nos. 7,230,232 and 7,119,330 provide examples of collision/reaction cells used in ICP-MS.

The ICP-MS instrument should preferably satisfy a number of analytical requirements, including high transmission, high stability, low influence from the sample matrix (the bulk composition of the sample, including, for example, water, organic compounds, acids, dissolved solids, and salts) in the plasma, and low throughput of oxide ions or doubly charged ions, etc. These parameters can be highly dependent upon the interface characteristics.

The interface characteristics are influenced by different processes, such as particle and gas dynamics, any secondary discharge, as well as kinetic energies of the charged species passing the interface (including also doubly charged, oxides, and hydroxide species). Changes in the plasma and/or interface, e.g. through changing sampling components (such as the inner diameter of the aperture of the sampler and skimmer cones), measurement under hot or cold plasma conditions, and use of organic solvents, have a direct impact on the interface characteristics and, therefore, on the ion transport efficiency.

Referring to FIG. 1, usually a fore vacuum pump 40, also known as a roughing pump, is used for the evacuation of the interface 3 between the sampling and skimmer cones 2 and 12. The sampling cone 2 is used to sample the atmospheric pressure plasma flame 4 that extends from the end of the plasma torch 6. The sampling cone 2 has a central aperture 8 having an inner diameter of approx. 1 mm, which typically allows a pressure $P_1$ of approx. 1-5 mbar in the interface region 3 between the sampling cone 2 and the skimmer cone 12, e.g. if a pumping speed of 5-15 L/s is used. These conditions determine the correct position of the aperture of the skimmer 12 inside the so-called zone of silence of the extracted plasma shown by the dotted line 14 in FIG. 1. A typical distance between the tips of the sampling and skimmer cones can be about 10 mm. The extracted jet beam forms a concentric shock wave structure which ends in a shock wave front called the Mach disk 16. The region within this shock wave structure is named the zone of silence 14 and contains the ions, electrons and neutrals, of which the ions have to be transferred to the mass analyser. This means that the skimmer cone aperture should be positioned in the zone of silence for adequate extraction of analyte ions. In other words, if the sampler and skimmer cones are static, as they generally are, the interface pressure in the region 3 must be low enough to position the Mach disk behind the aperture of the skimmer [see *Inductively Coupled Plasma Mass Spectrometry*, Akbar Montaser, John Wiley & Sons, 1998, ISBN 0471186201, 9780471186205]. The correlation between Mach disk and interface pressure was described by Olney et al. [Olney et al., J. Anal. At. Spectrom., 1999, 14, 9-17] as:

$$\frac{x_M}{D_o} = 0.67 \sqrt{\frac{P_0}{P_1}}$$

where:

$x_M$, is the distance between Sampler and Mach disk
$D_o$, is the diameter of Sampler orifice
$P_0$, is the Source pressure (atmosphere pressure)
$P_1$, is the Interface pressure Chiappini et al., *Development of a high-sensitivity inductively coupled plasma mass spectrometer for actinide measurement in the femtogram range*, J. Analytical Atomic Spectrometry, 1996, 11, 497-503 have shown that reducing the interface pressure can improve the instrument sensitivity. In that case, the lower pressure was achieved by adding an additional pump to the vacuum system.

Beyond the interface 3, the plasma is subjected to an ion extraction field by ion extraction optics 20, which draws positive ions from the plasma into an ion beam, repelling electrons and allowing neutral components to be pumped away. The ion beam is then transported downstream by ion optics (not shown) for mass analysis by a mass analyser 30 (not shown in detail). The ion beam may be deflected and/or guided from the extraction optics 20 towards the mass analyser 30 by one or more ion deflectors, ion lenses, and/or ion guides (not shown), which may operate with static or time-varying fields. A collision/reaction cell may be located upstream of the mass analyser, optionally with a mass filter located upstream of the collision/reaction cell (the latter configuration may be provided by a triple quadrupole arrangement as in the Thermo Scientific™ iCAP™ TQ ICP-MS).

The above outlined fundamental principles of the zone of silence and the shock wave description of the plasma do not explain the impact of the interface pressure completely, however, and there remains a need to improve instrument sensitivity in ICP-MS, under both routine and custom research experimental conditions. Against this background the present invention has been made.

U.S. Pat. No. 6,265,717 discloses an ICP-MS device with an interface for transferring ions from the ICP to the MS. The interface is provided with a controller for increasing the pressure in the interface from its normal pressure in order to selectively reduce interfering ions. A variable valve in the pump line can be controlled by a system controller connected to a personal computer.

Japanese patent application JP H11-185695 discloses an ICP-MS device provided with a variable valve for pressure regulation in an interface chamber to cope with both hot and cold plasma. How the variable valve is controlled is not disclosed.

SUMMARY

According to an aspect of the invention there is provided a method of operating a mass spectrometer vacuum interface, the vacuum interface comprising an evacuated expansion chamber downstream of a plasma ion source at atmospheric or relatively high pressure (compared to the pressure in the expansion chamber), the expansion chamber having a first aperture that interfaces with the plasma ion source to form an expanding plasma downstream of the first aperture and a second aperture downstream of the first aperture from the plasma for skimming the expanding plasma to form a skimmed expanding plasma; wherein the expansion chamber is pumped by an interface vacuum pump to provide an interface pressure in the chamber; the method comprising using a controller to automatically control or regulate the throughput of the interface vacuum pump to control the interface pressure. Thereby it is possible to optimise a detection sensitivity of the spectrometer, i.e. detection limits, for one or more elements being subject to mass analysis by the mass spectrometer. The control of the throughput of the vacuum pump is preferably dependent on one or more operating modes of the spectrometer, i.e. the method preferably comprises automatically setting the throughput dependent on one or more operating modes of the spectrometer. Preferably, the throughput of the vacuum pump is automatically controlled depending on one or more operating conditions of the plasma ion source and/or one or more elements of interest to be mass analysed by the spectrometer. Preferably, the vacuum pump is controlled directly, for instance by varying its operating voltage and/or operating current so as to vary its speed, rather than indirectly as is the case when using a valve.

According to another aspect of the invention there is provided an apparatus for operating a mass spectrometer vacuum interface, comprising:

a plasma ion source for generating a plasma at atmospheric or relatively high pressure;

an evacuated expansion chamber downstream of the plasma ion source, the expansion chamber having a first aperture that interfaces with the plasma ion source for forming an expanding plasma downstream of the first aperture and a second aperture downstream of the first aperture for skimming the expanding plasma to form a skimmed expanding plasma; wherein the expansion chamber is pumped by an interface vacuum pump to provide an interface pressure in the expansion chamber; and a controller configured to automatically control the throughput of the vacuum pump.

The controller is preferably configured to automatically control the throughput of the vacuum pump dependent on one or more operating modes of the spectrometer. The operating modes can include a plasma condition and/or a measurement mode (e.g. an analysis of a specific element). The controller is preferably configured to automatically control the throughput of the vacuum pump depending on one or more operating conditions of the plasma ion source and/or one or more elements of interest to be mass analysed by the spectrometer (measurement modes).

The one or more operating conditions of the plasma ion source preferably comprises the plasma temperature (i.e. as determined by the power supplied to the plasma ion source), a plasma torch position and/or a plasma gas flow. The identification of the one or more elements of interest to be mass analysed by the spectrometer can be input to the controller by a user such that the controller can automatically control the throughput of the vacuum pump to optimise the detection sensitivity for the one or more elements.

The invention in this way enables the interface pressure to be regulated, i.e. controlled, by a controller so as to optimise the detection sensitivity of the spectrometer for a particular element or elements being analysed under the given operating condition mode or set of operating conditions (e.g. the power supplied to the plasma/plasma temperature). In particular, the invention can ensure that the optimal interface pressure is provided by regulation of the interface vacuum pump throughput or pump speed to give the best instrument sensitivity under different experimental conditions (e.g. hot/cold plasma). Such regulation of the interface pressure dependent on the characteristics of different measurement modes is not provided in commercial ICP-MS instruments. In addition, directly controlling the interface vacuum pump is more efficient than regulating the interface vacuum through a valve or other mechanism.

DETAILED DESCRIPTION

In order to enable a more detailed understanding of the invention, various embodiments will now be described.

Figure 1:
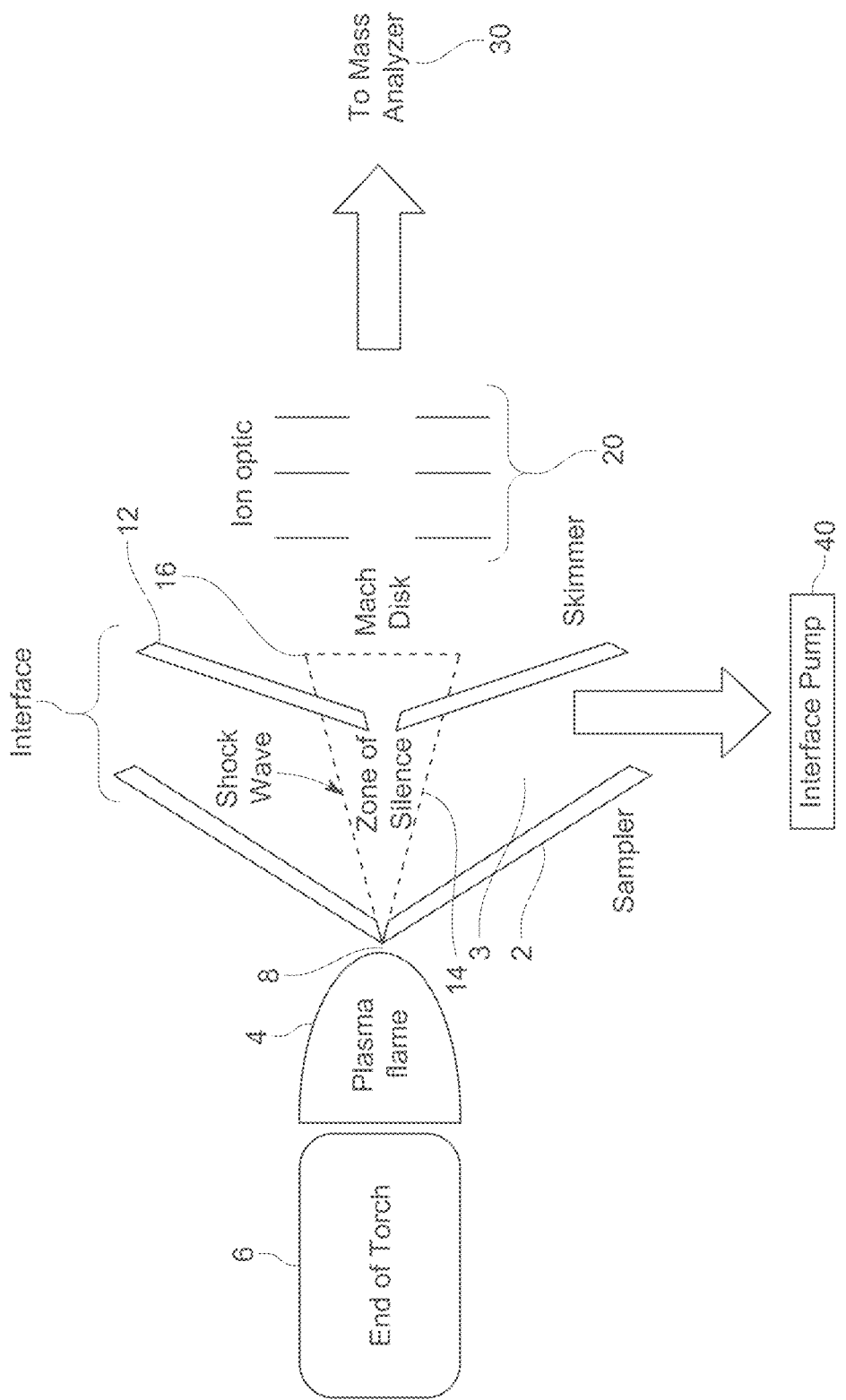
FIG. 1 shows a schematic view of a vacuum interface region.
Figure 2:
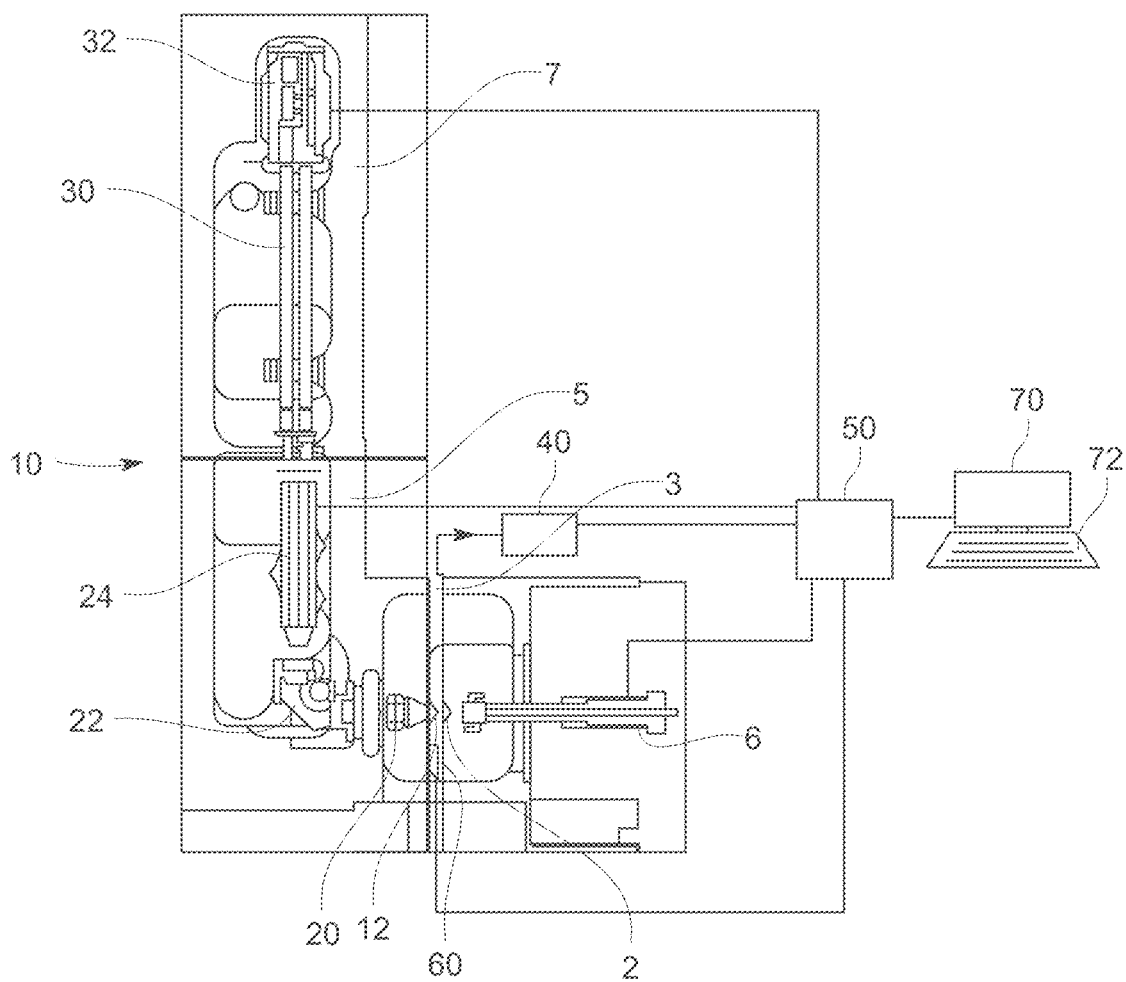
FIG. 2 shows a schematic view of a mass spectrometer.

Referring to FIG. 2 there is shown a mass spectrometer 10 according to an embodiment of the present invention. The mass spectrometer comprises a vacuum interface as generally shown in FIG. 1. The spectrometer overall comprises three vacuum stages: the interface vacuum 3, an intermediate vacuum 5, and a high vacuum 7. The inductively coupled plasma (ICP) torch 6, as described above, generates a high temperature plasma at atmospheric pressure from a gas such as argon and receives a sample containing one or more elements to be mass analysed and ionises the sample in the plasma. In general, the plasma ion source, can be an ICP, MIP, laser induced plasma, or other type of plasma ion source. Thus, the plasma ion source generates elemental ions that can be mass analysed in the downstream mass analyser. The description of the operation of a plasma ion source and introduction of a sample thereto is described above. Although the plasma is generally at atmospheric pressure, it can be lower than atmospheric pressure but at least a relatively high pressure (typically at least 100 mbar) compared to the interface pressure in the expansion chamber. Thus, the plasma ion source is generally at a pressure higher than 100 mbar, typically at atmospheric pressure. The ICP conditions may be varied between hot (e.g. 1550 W ICP torch power) and cold (e.g. 550 W) and optionally a warm setting intermediate between the hot and cold settings.

The plasma containing ions, gas and electrons is sampled through a first aperture provided by an aperture sampler cone 2 and forms an expanding plasma downstream thereof in an expansion chamber as shown in FIG. 1. The plasma is then skimmed by a second aperture provided by an apertured skimmer cone 12 and forms a skimmed or secondary plasma expansion downstream thereof. Between the sampler cone 2 and the skimmer cone 12 is an expansion chamber that forms the interface vacuum stage 3, wherein the pressure is typically desired to be in a range 0.1-10 mbar, preferably 1-10 mbar.

Beyond the interface vacuum stage 3, the skimmed plasma is subjected to an ion extraction field by ion extraction optics 20 located in the intermediate vacuum stage 5, which draws positive ions from the plasma into an ion beam, repelling electrons and allowing neutral components to be pumped away. The intermediate vacuum stage 5 is typically pumped to approximately $1 \times 10^{-5}$ to $5 \times 10^{-5}$ mbar. The ion beam is then transported downstream in the intermediate vacuum stage 5 by 90 degree bending ion optics 22 to a gas-filled collision/reaction cell 24 comprising a quadrupole for removal of interferences. Beyond the intermediate vacuum stage 5, the ion beam is finally guided to a quadrupole mass analyser 30 and an ion detector 32, such as a SEM, located in the high vacuum stage 7, wherein the pressure is generally less than in the intermediate vacuum stage 5 and thus typically less than $1\text{-}5 \times 10^{-5}$ mbar. Optionally, a mass pre-filter, such as a quadrupole mass filter, can be located upstream of the collision/reaction cell 24 to enhance removal of interferences from the ion beam. The latter configuration therefore provides a triple quadrupole arrangement. It will be appreciated that other types of mass analysers may be provided as alternative to the quadrupole mass analyser, such as a magnetic and/or electric sector mass analyser, a time-of-flight mass analyser, or an ion trap mass analyser, among others.

The expansion chamber of the interface vacuum stage 3 is typically pumped to a pressure in the range 1 to 10 mbar by an interface vacuum pump 40. The interface vacuum pump is preferably a fore vacuum pump, also termed a roughing pump. The intermediate and high vacuum stages 5 and 7 are pumped by a split flow turbomolecular pump (not shown), the exhaust of which is pumped by the fore vacuum pump 40. Thus, the fore vacuum pump in some embodiments is conveniently the fore vacuum pump for a high vacuum pump that pumps a high vacuum region of the mass spectrometer.

The regulation of the throughput (or speed) of the vacuum pump preferably comprises automatically controlling the throughput of the vacuum pump using a controller 50, which is interfaced to the pump. The controller may be a computer-based controller. The controller 50 may comprise a computer and associated controlling electronics, for example a controlling voltage supply, that are interfaced to the vacuum pump 40. The throughput of the vacuum pump 40 can be regulated by the controller, for example via digital ports on the pump that interface to the controller and using software that is run on the computer of the controller. In this way, the speed of the pump can be controlled, for example, via an external voltage to control the settings of the frequency converter of the pump. The vacuum pump is preferably configured so that its throughput can be continuously or quasi-continuously (for example, substantially continuously, and/or at certain intervals) adjusted by the controller across a range of throughput speeds (measured for example in pumping speed (L/s), or pumping cycles per second (Hz)), i.e. the pump has more than just two or three discrete pumping speeds that can be set but effectively many times that number due to its continuously adjustable speed.

The interface vacuum pump is preferably a fore vacuum pump, such as a rotary vane type, Scroll type, Roots type or diaphragm type, especially oil-free models of such pumps. Preferably, therefore, the interface vacuum pump is dry fore vacuum pump. Such pumps are preferably capable to achieve a pressure in the range 0.1 to 100 mbar. The interface pressure of the expansion chamber is typically arranged to be in the range 1 to 10 mbar. The throughput or pumping speed of the interface vacuum pump is preferably controlled by changing the speed of the pump, for example by changing the rotation speed of a rotary vane type or Roots type of pump. Alternatively, or additionally, in some embodiments, the throughput of the fore vacuum pump can be controlled by controlling the size of an aperture located on the input side (i.e. upstream) of the pump. An electro-mechanically variable aperture, e.g. in a proportional valve, interfaced to the controller can be used for this purpose.

The controller may also, for example via suitable controlling electronics, control the operation of the mass spectrometer 10, including any one or more of the plasma ion source, ion optics, collision cell and mass analyser. The computer of the controller may also acquire and process data from the mass spectrometer, in particular signals from the mass analyser and detector 32, e.g. to generate a mass spectrum from the mass analysis. In some embodiments, the data acquired from the mass spectrometer, optionally after processing by the controller, may be used by the controller to adjust the throughput of the vacuum pump in order to optimise the detection sensitivity of the spectrometer for at least one element.

In some embodiments, the throughput of the vacuum pump 40 is automatically controlled depending upon the operating conditions of the plasma ion source 6. For example, it is known to operate a plasma ion source of a mass spectrometer at either a hot plasma condition, for example with a power for an ICP ion source of 1300-1700 W (giving a plasma temperature of e.g. 8,000-10,000 K), or a cold plasma condition for example with a power for an ICP ion source of 400-600 W (giving a plasma temperature of e.g. about 5,000 K). The choice of hot or cold plasma may depend upon the particular elements in the sample desired to be mass analysed and the sample matrix for example. Cold plasma for ICP-MS has advantages for the ultralow detection of certain trace elements. At low RF power, the overall ionization efficiency in the ICP is decreased, limiting the formation of background argon and some sample matrix based interferences. This reduces the requirement for operation in additional interference reduction modes, thereby reducing analysis time and improving sample throughput. With the ICP ion source operating at a lower RF power (generally <600 W) in cold mode, the plasma is smaller and any interaction with the sampling interface and sample introduction system is reduced. A preferentially higher signal to noise ratio can be obtained in cold plasma than in hot plasma for low ionization potential elements (such as Li and Na, etc.), which leads to lower limits of detection.

However, changing the plasma conditions may lead to a change in the interface pressure for a given throughput of the fore vacuum pump and, consequently, result in interface characteristics that allow for less than optimum ion transfer and detection sensitivity.

In order to address this issue, embodiments of the invention may comprise changing the plasma ion source operating conditions from a first operating condition to a second operating condition, or vice versa, and respectively automatically adjusting the throughput of the interface vacuum pump from a first throughput when operating the plasma at the first operating condition to a second throughput when operating the plasma at the second operating condition. The first and second throughputs are preferably different to each other. The controller 50 preferably controls the operating conditions of the plasma ion source 6, for example in accordance with a selection of an operating condition (e.g. the plasma temperature or power provided to the ICP torch), for example input by a user, and automatically adjusts the throughput of the interface vacuum pump 40 depending on the conditions, e.g. in accordance with a computer program (software) run on the computer of the controller 50. The controller 50 may automatically adjust the throughput of the interface vacuum pump 40 by varying the pump's supply voltage and/or current, for example the amplitude of the supply voltage and/or, in case of an AC (alternating current) pump, the frequency of the supply voltage.

In a preferred embodiment, the first operating condition and the second operating condition differ in the temperature of the plasma, more preferably the first operating condition may be a hot plasma condition and the second operating condition may be a cold plasma condition. As an example, the throughput of the vacuum pump may be increased when changing from the hot plasma condition to the cold plasma condition, for example by increasing the speed of the vacuum pump 40. Other different operating conditions may relate to standby (plasma off), different plasma torch positions and/or different plasma gas flows.

Figure 3:
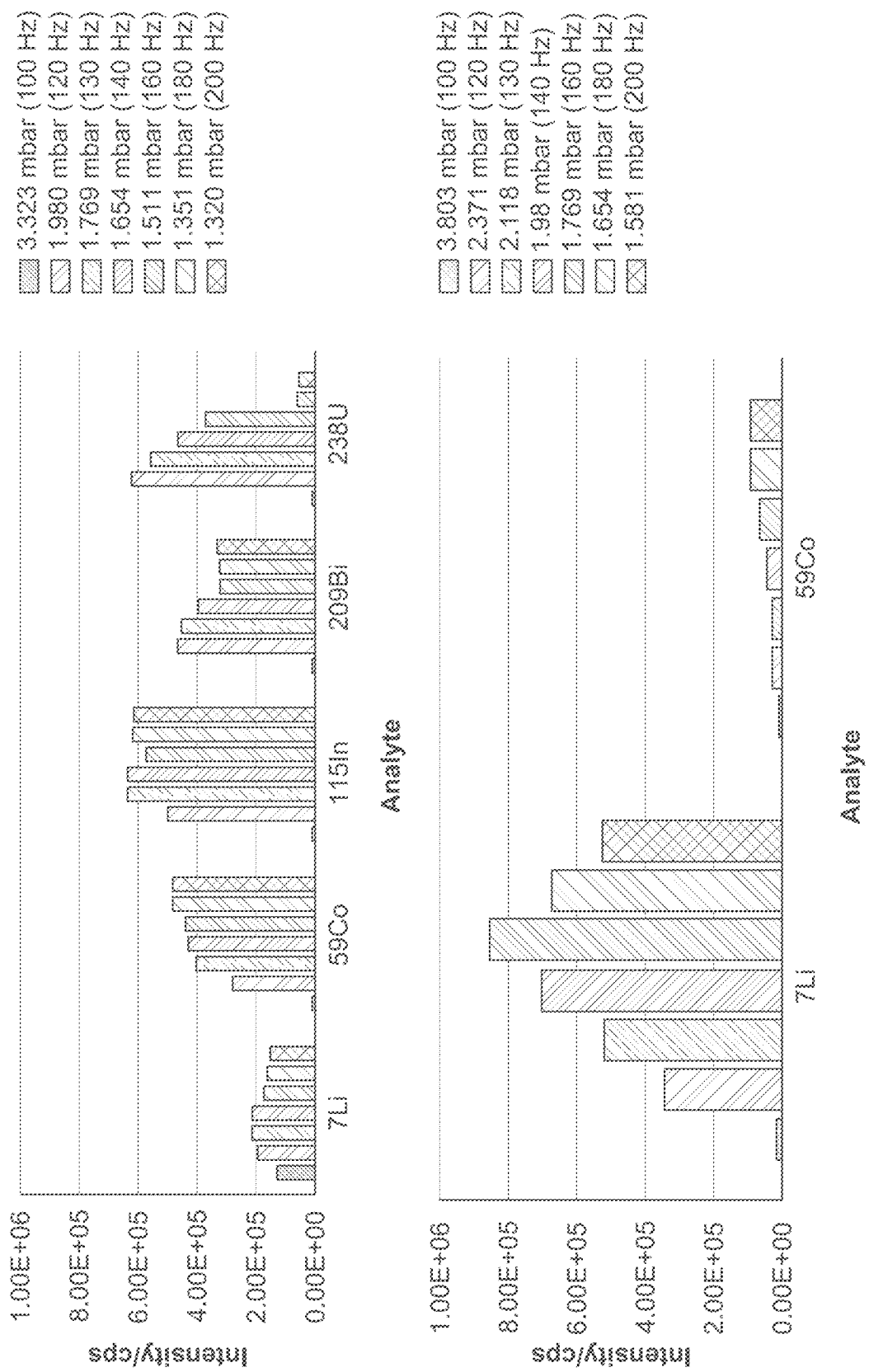
FIG. 3 shows bar diagrams of intensities of selected elements measured on an ICP-MS instrument using different interface vacuum pump speed settings for both hot (upper diagram) and cold (lower diagram) plasma conditions.

Referring to FIG. 3, there is shown the intensities of selected elements ($^{7}$Li, $^{59}$Co, $^{115}$In, $^{209}$Bi, $^{238}$U) in an iCAP TQ Tune Solution (1 ppb Li, Co, In, Ba, Ce, Bi, U in 2% HNO$_3$) measured by a Thermo Scientific™ iCAP™ TQ ICP-MS using different fore vacuum pump speed settings, which results in different interface pressure values as measured by a Pirani gauge. The fore vacuum pump was a Roots pump manufactured by Leybold Oerlikon, model ecoDry 65plus. The upper bar diagram in FIG. 3 shows the results of an experiment using hot plasma conditions (ICP power 1550 W). The lower bar diagram shows the results of an experiment using cold plasma conditions (ICP power 550 W). Table 1 shows the pump speeds (in pump cycles or rotations per second, Hz) and the corresponding pressures obtained in the vacuum interface under the Hot and Cold conditions.

TABLE 1

| Pump speed (Hz) | Interface pressure (mbar) HOT plasma | Interface pressure (mbar) COLD plasma |
| --- | --- | --- |
| 100 | 3.323 | 3.803 |
| 120 | 1.980 | 2.371 |
| 130 | 1.769 | 2.118 |
| 140 | 1.654 | 1.980 |
| 160 | 1.511 | 1.769 |
| 180 | 1.351 | 1.654 |
| 200 | 1.320 | 1.581 |

Firstly, it is seen that with the same pump speed, different interface pressures are obtained under the hot and cold plasma conditions. For example, with a pump speed of 130 Hz, a Pirani pressure of 1.769 mbar is achieved under hot plasma conditions whereas only a vacuum pressure of 2.118 mbar is achieved under cold plasma conditions. Accordingly, if cold plasma is selected, the pump speed has to be increased from 130 Hz to 160 Hz to achieve a similar interface pressure of 1.769 mbar. The benefit of increasing the pump speed in the cold plasma condition can be seen from the Li intensities, which increase by a factor of approximately 2 when increasing the pumping speed from 130 to 160 Hz. Secondly, it is seen that the instrument's detection sensitivity for each element has a dependence on the interface pressure and, furthermore, the behaviour of the sensitivity for different elements does not show the same pattern of interface pressure dependence for all elements. In this way, it can be seen that an optimum interface pressure can be set by the controller by appropriate control of the vacuum pump throughput that provides an optimum detection sensitivity for a particular element. Maintaining the interface pressure at that optimum while performing mass analysis on the spectrometer for that element can be achieved by means of a pressure gauge signal that feeds back to the controller as described further below.

The first and second throughputs of the vacuum pump are preferably set by the controller 50. In more detail, the first throughput is preferably set by the controller, preferably optimised, to provide a first interface pressure in the interface vacuum stage 3. Preferably, the first interface pressure optimises detection sensitivity for at least one element of the sample being mass analysed using the first operating condition. The second throughput is preferably set by the controller, preferably optimised, to provide a second interface pressure. Preferably, the second interface pressure optimises detection sensitivity for at least one element being mass analysed using the second operating condition. The at least one element whose detection sensitivity is optimised under the first operating condition may be the same or different, but preferably different, to the at least one element whose detection sensitivity is optimised under the second operating condition. In some embodiments, it is advantageous that the controller controls the first and second interface pressures to be substantially the same (preferably they are the same pressure within 10%, or more preferably within 5%, i.e. the lower pressure being within 10% or 5% of the higher pressure of the two). It will be appreciated, therefore, that in this way the interface pressure in the expansion chamber is maintained substantially constant by the adjustment of the throughput of the vacuum pump upon changing the plasma conditions. It will be appreciated that other operating conditions than the hot and cold plasma conditions, e.g., sampling depth, cone orifices or sample matrix (organics, aqueous), could also be changed to provide the first and second operating conditions and the throughput of the vacuum pump adjusted accordingly by the controller, e.g. to maintain the substantially constant interface pressure in the expansion chamber.

It will be appreciated that, in some embodiments, more than two different operating conditions may be provided, e.g. set by the controller 50, each having a respective vacuum pump throughput set by the controller. Thus, one or more further operating conditions and one or more further throughputs may be employed in an analogous manner in addition to the first and second operating conditions and throughputs described. As an example, a third operating condition of the plasma ion source, such as a "warm" plasma condition, which is intermediate in power, and thus temperature, between the hot and cold conditions, may be employed with the controller setting a corresponding third throughput of the vacuum pump to provide a third interface pressure. The third interface pressure may be substantially the same or different to the first and second interface pressures (preferably different). As another example, a further operating condition of the plasma ion source may be a switched-off or standby condition (i.e. the plasma is turned off), with the controller then setting a corresponding further throughput of the vacuum pump, especially the speed of the pump, to provide a further interface pressure. Generally, where the operating condition is a switched-off or standby condition, the corresponding throughput (speed) of the vacuum pump is lower than it is for the other operating conditions (e.g. when analysis is being performed with the spectrometer) thereby to provide a lower vacuum (higher pressure) for the interface pressures in the expansion chamber. In this way, by operating with a lower speed of the vacuum pump, a reduced power consumption or "Eco" mode is provided during standby conditions.

In some preferred embodiments, a pressure gauge 60, e.g. a Pirani gauge, can be located in the expansion chamber of the interface vacuum stage. In operation, controlling the throughput of the vacuum pump 40 can comprise providing a set pressure value to the controller 50, which can be user input (e.g. via a graphical user interface) or provided in the computer software of the controller based on the operating conditions, receiving at the controller 50 pressure signals over time from the pressure gauge 60 indicative of the interface pressure in the expansion chamber over time and controlling the throughput of the vacuum pump 40 using the controller 50 so as to maintain the interface pressure at the set pressure. The set pressure may be a pressure that is desired to be maintained at a given time, e.g. the first interface pressure and/or the second interface pressure mentioned above. Thus, a feedback loop is provided between the pressure gauge 60 and the controller 50 so that the controller can continuously adjust the throughput of the vacuum pump 40 to maintain the interface pressure at the set pressure (e.g. the pressure that is desired to be maintained at a given time, such as either the first interface pressure or the second interface pressure). In this way, if the pressure rises above the set pressure, the pressure signal received by the controller will cause the controller to adjust the throughput of the pump so that the pressure is lowered to the set value. Similarly, if the pressure falls below the set pressure, the pressure signal received by the controller will cause the controller to adjust the throughput of the pump so that the pressure is raised to the set value. This type of control can be used to maintain a set pressure in the expansion chamber while mass analysis is performed by the mass spectrometer. The same interface pressure can thereby be maintained over time across the mass analysis of a sequence of samples.

In some of the above embodiments, in which the first and second throughputs provide first and second interface pressures corresponding to the first and second operating conditions, the first and second pressures may be substantially the same pressure which may be the set pressure that is used by the controller in a feedback loop with the pressure gauge to continuously adjust the throughput of the vacuum pump to maintain the interface pressure at the set pressure under both the first and second operating conditions. In some of the above embodiments, in which the first and second throughputs provide first and second interface pressures corresponding to the first and second operating conditions, the first and second pressures may be different pressures. In that case, the first interface pressure may be a first set pressure that is used by the controller in the feedback loop with the pressure gauge to continuously adjust the throughput of the vacuum pump to maintain the interface pressure at the first set pressure under the first operating condition, and the second interface pressure may be a second set pressure that is used by the controller in the feedback loop with the pressure gauge to continuously adjust the throughput of the vacuum pump to maintain the interface pressure at the second set pressure under the second operating condition. Thus, some embodiments of the invention comprise providing a pressure gauge in the expansion chamber. The use of the pressure gauge can comprise the steps: (i) measuring the interface pressure using the gauge and (ii) providing signals representative of the measured pressure to the controller, wherein (iii) the controller compares the measured pressure to a set pressure and if there is a difference between the measured and set pressures, the controller adjusts the throughput of the vacuum pump to reduce the difference between the measured pressure and set pressure, wherein the steps (i)-(iii) are repeated in a feedback loop to maintain the interface pressure substantially at the set pressure.

In some embodiments, a user can override the automatic control and the set interface pressure that may be provided by the software of the computer-based controller. Thus, at least for a period of time the automatic regulation of the pump throughput by the controller can be overridden by a user such that for the period the throughput is set by the user. Typically, the user will directly input the pump throughput to the controller. For example, in some such embodiments, a user can adjust the throughput of the vacuum pump and thus the interface pressure in order to optimise the detection sensitivity for one or more elements that the user is interested in. This enables a user for a period of time to tune the throughput of the vacuum pump so as to optimise the detection sensitivity. The user can thereby adjust the vacuum pump throughput based on observing the effect that such adjustment has on the detection sensitivity of one or more elements in a mass spectrum produced on the spectrometer. In such embodiments, the controller is preferably connected to a visual display or monitor 70 (i.e. VDU—Visual Display Unit), such that certain parameters are displayed to the user, for example the throughput of the pump, e.g. pump speed, and/or the interface pressure. The displayed throughput of the pump is, at least initially, preferably the automatically controlled throughput, that is, the throughput as determined by the automatic control. The VDU 70 may also display other information to the user, such as one or more of the operating or sampling (plasma) conditions, a sample identification, mass spectral data etc. In some such embodiments, an 'override' mode can be implemented, by means of a graphical user interface (GUI) displayed on the VDU and an input device 72, such as a mouse or keyboard for example, the user can command the controller to set a particular throughput of the vacuum pump and/or a particular interface pressure. In an example, the GUI may provide an Instrument Control Window, which may contain a slider, which can be moved by the user using an input device, e.g. using a mouse, to set the pump throughput (speed). The slider may be moved to any point on a scale from 0-100% of the maximum pump speed in the Instrument Control window and thus is used for regulation of the pump speed and throughput in a defined range for achieving the interface pressure of interest. It may be possible using the invention to control the interface pressure continuously or quasi-continuously from 0.1 to 200 mbar, preferably 0.1 to 100 mbar, and more preferably 0.1 to 10 mbar by regulation of the throughput of the fore vacuum pump.

In some embodiments, the GUI can be used by the user to input a selection of an operating condition (e.g. the plasma temperature or power provided to the ICP torch), and/or an identification of one or more elements of interest to be mass analysed by the spectrometer. In this way, the controller can automatically control the throughput of the vacuum pump to optimise the detection sensitivity for one or more elements to be mass analysed depending on the selection of operating condition. Furthermore, when the user inputs an identification of one or more elements of interest to be mass analysed, the controller can automatically control the throughput of the vacuum pump in a fine-tune mode to optimise the detection sensitivity for the one or more elements. In such embodiments, the controller can be programmed (e.g. by its software) to set different throughputs of the vacuum pump for different elements, with each element having its own respective throughput setting that optimises detection sensitivity for that element under the selected operating (plasma) conditions, and a throughput of the pump is thereby set by the controller according to the element or elements of interest specified by the user.

In a further aspect, alternative to automatic control of the throughput of the pump and/or the interface pressure, there is provided a method of operating a mass spectrometer vacuum interface, the vacuum interface comprising an evacuated expansion chamber downstream of a plasma ion source at atmospheric or relatively high pressure, the expansion chamber having a first aperture that interfaces with the plasma ion source to form an expanding plasma downstream of the first aperture and a second aperture downstream of the first aperture from the plasma for skimming the expanding plasma to form a skimmed expanding plasma; wherein the expansion chamber is pumped by an interface vacuum pump to provide an interface pressure in the chamber; the method comprising using a controller to control the throughput of the interface vacuum pump to control the interface pressure, wherein a user inputs to the controller a particular throughput of the vacuum pump and/or a particular interface pressure and the controller sets the throughput of the vacuum pump and/or a particular interface pressure according to the input, for example to optimise detection sensitivity for one or more elements being subject to mass analysis by the mass spectrometer. Preferably, the controller is connected to a Visual Display Unit (VDU), such that the throughput of the pump and/or the interface pressure are displayed to the user, wherein by means of a graphical user interface (GUI) displayed on the VDU and an input device the user commands the controller to set a particular throughput of the vacuum pump and/or a particular interface pressure. The features of the invention described above are also applicable to the further aspect. For example, when the user has input the throughput of the pump and/or the interface pressure to be set by the controller, the controller and the pressure gauge maintain the set pressure by the feedback method described.

Similarly, the further aspect also provides an apparatus for operating a mass spectrometer vacuum interface, comprising: a plasma ion source for generating a plasma at atmospheric or relatively high pressure; an evacuated expansion chamber downstream of the plasma ion source, the expansion chamber having a first aperture that interfaces with the plasma ion source for forming an expanding plasma downstream of the first aperture and a second aperture downstream of the first aperture for skimming the expanding plasma to form a skimmed expanding plasma; wherein the expansion chamber is pumped by an interface vacuum pump to provide an interface pressure in the expansion chamber; and a controller configured to control the throughput of the vacuum pump, whereby a user can input to the controller a particular throughput of the vacuum pump and/or a particular interface pressure and the controller sets the throughput of the vacuum pump and/or a particular interface pressure according to the input, for example to optimise detection sensitivity for one or more elements being subject to mass analysis by the mass spectrometer. Preferably, the controller is connected to a Visual Display Unit (VDU), such that the throughput of the pump and/or the interface pressure are displayed to the user, and wherein by means of a graphical user interface (GUI) displayed on the VDU and an input device, the user can command the controller to set a particular throughput of the vacuum pump and/or a particular interface pressure.

In some embodiments, the data acquired from the mass spectrometer, optionally after processing by the controller, may be used by the controller to adjust the throughput of the vacuum pump in order to optimise the detection sensitivity of the spectrometer for at least one element. The controller may acquire data from the mass spectrometer and optionally may process the data to generate a mass spectrum therefrom. For one or more elements of interest, for an initial throughput of the interface vacuum pump, the controller may determine the signal intensity (at the detector) from the data. The controller may then adjust the throughput of the interface vacuum pump, re-acquire data from the mass spectrometer and re-determine the signal intensity. This may be repeated until an optimum throughput of the interface vacuum pump (and thereby optimum interface pressure) is found that corresponds to a maximum signal intensity for the one or more elements. The controller may then maintain the optimum throughput of the interface vacuum pump for measurement of the one or more elements. The procedure may be repeated for one or more different elements to find a respective optimum throughput of the interface vacuum pump for each element.

Advantageously, the invention enables an increase of sensitivity of the mass spectrometer by an easy-to-use regulation of the interface pressure for different sampling conditions, e.g. hot or cold plasma, or different measurement modes. An ICP mass spectrometer is thus provided in which the regulation of the throughput of the fore vacuum pump is used for optimization of the interface pressure for achieving the best instrument sensitivity under different experimental conditions.

In view of the above disclosure, it will be appreciated that embodiments of the invention can be provided in accordance with the following clauses:

Clause 1: A method of operating a mass spectrometer vacuum interface, the vacuum interface comprising an evacuated expansion chamber downstream of a plasma ion source at atmospheric or relatively high pressure, the expansion chamber having a first aperture that interfaces with the plasma ion source to form an expanding plasma downstream of the first aperture and a second aperture downstream of the first aperture from the plasma for skimming the expanding plasma to form a skimmed expanding plasma; wherein the expansion chamber is pumped by an interface vacuum pump to provide an interface pressure in the chamber; the method comprising using a controller to automatically control the throughput of the interface vacuum pump to control the interface pressure dependent on one or more operating modes of the spectrometer to optimise detection sensitivity for one or more elements being subject to mass analysis by the mass spectrometer.

Clause 2: A method according to clause 1 wherein the throughput of the interface vacuum pump is controlled depending on one or more operating conditions of the plasma ion source and/or one or more elements of interest to be mass analysed by the spectrometer.

Clause 3: A method according to clause 2 wherein the plasma ion source is an inductively coupled plasma (ICP) ion source and the one or more operating conditions comprises a plasma temperature, plasma torch position and/or plasma gas flow.

Clause 4: A method according to any preceding clause wherein the controller comprises a computer and associated controlling electronics interfaced to the interface vacuum pump.

Clause 5: A method according to any preceding clause wherein the interface vacuum pump is a fore vacuum pump for a high vacuum pump that pumps a high vacuum region of the mass spectrometer and the interface pressure in the chamber is controlled to be in a range 0.1-10 mbar.

Clause 6: A method according to any preceding clause further comprising acquiring data from the mass spectrometer at the controller and using the data to adjust the throughput of the vacuum pump in order to optimise the detection sensitivity of the spectrometer for at least one element.

Clause 7: A method according to any preceding clause further comprising changing the plasma ion source operating conditions from a first operating condition to a second operating condition, or vice versa, and respectively automatically controlling the throughput of the interface vacuum pump from a first throughput when operating the plasma at the first operating condition to a second throughput when operating the plasma at the second operating condition, wherein the first and second throughputs are different to each other.

Clause 8: A method according to clause 7 wherein the first operating condition is a hot plasma condition and the second operating condition is a cold plasma condition.

Clause 9: A method according to clause 7 or 8 wherein the first throughput provides a first interface pressure in the interface vacuum stage to optimise detection sensitivity for at least one element of the sample being mass analysed using the first operating condition and the second throughput provides a second interface pressure to optimise detection sensitivity for at least one element being mass analysed using the second operating condition.

Clause 10: A method according to clause 9 wherein the at least one element whose detection sensitivity is optimised under the first operating condition is different to the at least one element whose detection sensitivity is optimised under the second operating condition.

Clause 11: A method according to clause 9 or 10 wherein the first and second interface pressures are controlled to be substantially the same.

Clause 12: A method according to any preceding clause wherein more than two different operating conditions are provided, each having a respective vacuum pump throughput set by the controller.

Clause 13: A method according to any preceding clause further comprising providing a pressure gauge in the expansion chamber, (i) measuring the interface pressure using the pressure gauge, (ii) providing signals representative of the measured pressure to the controller, and (iii) comparing the measured pressure to a set pressure using the controller and if the controller determines that there is a difference between the measured and set pressures, the controller adjusts the throughput of the vacuum pump to reduce the difference between the measured pressure and set pressure, wherein the steps (i)-(iii) are repeated in a feedback loop to maintain the interface pressure substantially at the set pressure.

Clause 14: A method according to any preceding clause wherein the controller is connected to a Visual Display Unit (VDU), such that the throughput of the pump, which is preferably initially automatically controlled, and/or the interface pressure are displayed to a user, and wherein by means of a graphical user interface (GUI) displayed on the VDU and an input device, the user overrides the automatic control and manually sets a particular throughput of the vacuum pump and/or a particular interface pressure.

Clause 15: An apparatus for operating a mass spectrometer vacuum interface, comprising: a plasma ion source for generating a plasma at atmospheric or relatively high pressure; an evacuated expansion chamber downstream of the plasma ion source, the expansion chamber having a first aperture that interfaces with the plasma ion source for forming an expanding plasma downstream of the first aperture and a second aperture downstream of the first aperture for skimming the expanding plasma to form a skimmed expanding plasma; wherein the expansion chamber is pumped by an interface vacuum pump to provide an interface pressure in the expansion chamber; and a controller configured to automatically control the throughput of the vacuum pump dependent on one or more operating modes of the spectrometer.

Clause 16: An apparatus according to clause 15 wherein the controller is configured to automatically control the throughput of the vacuum pump dependent on a plasma condition and/or a measurement mode.

Clause 17: An apparatus according to clause 15 or 16 wherein the plasma ion source is an inductively coupled plasma (ICP) ion source.

Clause 18: An apparatus according to any of clauses 15 to 17 wherein the controller comprises a computer and associated controlling electronics interfaced to the interface vacuum pump.

Clause 19: An apparatus according to any of clauses 15 to 18 wherein the throughput of the vacuum pump can be continuously or quasi-continuously adjusted by the controller across a range of throughput speeds.

Clause 20: An apparatus according to any of clauses 15 to 19 wherein the interface vacuum pump is a fore vacuum pump for a high vacuum pump that pumps a high vacuum region of the mass spectrometer.

Clause 21: An apparatus according to any of clauses 15 to 20 wherein the controller is configured to automatically adjust the throughput of the interface vacuum pump from a first throughput when operating the plasma ion source at a first operating condition to a second throughput when operating the plasma ion source at a second operating condition, wherein the first and second throughputs are different to each other.

Clause 22: An apparatus according to clause 21 wherein the first operating condition and the second operating condition differ in the temperature of the plasma, preferably wherein the first operating condition is a hot plasma condition and the second operating condition is a cold plasma condition.

Clause 23: An apparatus according to clause 21 or 22 wherein the first throughput provides a first interface pressure in the interface vacuum stage to optimise detection sensitivity for at least one element of the sample being mass analysed using the first operating condition and the second throughput provides a second interface pressure to optimise detection sensitivity for at least one element being mass analysed using the second operating condition.

Clause 24: An apparatus according to clause 23 wherein the at least one element whose detection sensitivity is optimised under the first operating condition is different to the at least one element whose detection sensitivity is optimised under the second operating condition.

Clause 25: An apparatus according to clause 23 or 24 wherein the controller controls the first and second interface pressures to be substantially the same.

Clause 26: An apparatus according to any of clauses 15 to 25 wherein a pressure gauge is located in the expansion chamber and a feedback loop is provided between the pressure gauge and the controller so that the controller can continuously adjust the throughput of the vacuum pump to maintain the interface pressure at a set pressure.

Clause 27: An apparatus according to any of clauses 15 to 26 wherein the controller is connected to a Visual Display Unit (VDU), such that the throughput of the pump and/or the interface pressure are displayed to a user, and wherein by means of a graphical user interface (GUI) displayed on the VDU and an input device, the user can command the controller to set a particular throughput of the vacuum pump and/or a particular interface pressure.

Clause 28: A method of operating a mass spectrometer vacuum interface, the vacuum interface comprising an evacuated expansion chamber downstream of a plasma ion source at atmospheric or relatively high pressure, the expansion chamber having a first aperture that interfaces with the plasma ion source to form an expanding plasma downstream of the first aperture and a second aperture downstream of the first aperture from the plasma for skimming the expanding plasma to form a skimmed expanding plasma; wherein the expansion chamber is pumped by an interface vacuum pump to provide an interface pressure in the chamber; the method comprising using a controller to control the throughput of the interface vacuum pump to control the interface pressure, wherein a user inputs to the controller a particular throughput of the vacuum pump and/or a particular interface pressure and the controller sets the throughput of the vacuum pump and/or a particular interface pressure according to the input.

Clause 29: A method according to clause 28 wherein the controller is connected to a Visual Display Unit (VDU), such that the throughput of the pump and/or the interface pressure are displayed to the user, wherein by means of a graphical user interface (GUI) displayed on the VDU and an input device the user commands the controller to set a particular throughput of the vacuum pump and/or a particular interface pressure.

Clause 30: A method according to clause 28 or 29 wherein a pressure gauge is located in the expansion chamber and a feedback loop is provided between the pressure gauge and the controller so that the controller can maintain the interface pressure at the pressure set.

Clause 31: An apparatus for operating a mass spectrometer vacuum interface, comprising: a plasma ion source for generating a plasma at atmospheric or relatively high pressure; an evacuated expansion chamber downstream of the plasma ion source, the expansion chamber having a first aperture that interfaces with the plasma ion source for forming an expanding plasma downstream of the first aperture and a second aperture downstream of the first aperture for skimming the expanding plasma to form a skimmed expanding plasma; wherein the expansion chamber is pumped by an interface vacuum pump to provide an interface pressure in the expansion chamber; and a controller configured to control the throughput of the vacuum pump, whereby a user can input to the controller a particular throughput of the vacuum pump and/or a particular interface pressure and the controller sets the throughput of the vacuum pump and/or a particular interface pressure according to the input.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" means "one or more".

Throughout the description and claims of this specification, the words "comprise", "including", "having" and "contain" and variations of the words, for example "comprising" and "comprises" etc, mean "including but not limited to", and are not intended to (and do not) exclude other components.

The present invention also covers the exact terms, features, values and ranges etc. in case these terms, features, values and ranges etc. are used in conjunction with terms such as about, around, generally, substantially, essentially, at least etc. (e.g., "about 3" shall also cover exactly 3, or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

We claim:

1. A method of operating a mass spectrometer vacuum interface:
    wherein the vacuum interface comprises an evacuated expansion chamber situated downstream of a plasma ion source and upstream of a mass analyzer, the expansion chamber having a first aperture that interfaces with the plasma ion source to form an expanding plasma downstream of the first aperture and a second aperture, downstream of the first aperture from the plasma ion source and upstream of the mass analyzer, for skimming the expanding plasma to form a skimmed expanding plasma;
    wherein the expansion chamber is pumped by an interface vacuum pump to provide an interface pressure in the expansion chamber, the interface vacuum pump is coupled to a controller, and the controller is coupled to a Visual Display Unit (VDU) upon which a graphical user interface (GUI), supporting a plurality of GUI modes, is displayed; and
    the method comprises, by the controller:
        receiving, via the GUI and a first input device, a selection of one or more operating conditions of the plasma ion source, wherein the selected one or more operating conditions of the plasma ion source comprise: electrical power supplied to the plasma ion source, a temperature of the plasma, or a plasma torch position;
        dependent on the selected one or more operating conditions of the plasma ion source, automatically controlling a rotation speed of the interface vacuum pump to automatically maintain a predetermined value of the interface pressure between the first and second apertures of the expansion chamber;
        initially displaying the automatically controlled rotation speed of the interface vacuum pump and/or the automatically maintained interface pressure on the GUI in a first GUI mode;
        receiving input, via the GUI, to enter an override mode and set a particular rotation speed of the interface vacuum pump, provided via the GUI, and/or a particular interface pressure, provided via the GUI; and
        in the override mode, displaying on the GUI the particular rotation speed of the interface vacuum pump as set and/or the particular interface pressure as set.

2. The method of claim 1, wherein:
    the receiving a selection further includes receiving a selection of one or more elements of interest to be mass analyzed by the mass spectrometer; and
    the automatically controlling the rotation speed and the interface pressure are also dependent on the selected one or more elements.

3. An apparatus for operating a mass spectrometer vacuum interface, comprising:
    a plasma ion source for generating a plasma;
    an evacuated expansion chamber downstream of the plasma ion source and upstream of a mass analyzer, the expansion chamber having a first aperture that interfaces with the plasma ion source for forming an expanding plasma downstream of the first aperture and a second aperture downstream of the first aperture from the plasma ion source and upstream of the mass analyzer, for skimming the expanding plasma to form a skimmed expanding plasma;
    wherein the expansion chamber is pumped by an interface vacuum pump to provide an interface pressure in the expansion chamber;
    a controller coupled to the interface vacuum pump; and
    coupled to the controller, a visual display unit (VDU) upon which a graphical user interface (GUI), supporting a plurality of GUI modes, is displayed;
    wherein the controller is configured to:
        receive, via the GUI and a first input device, a selection of one or more operating conditions of the plasma ion source, wherein the selected one or more operating conditions of the plasma ion source comprise: electrical power supplied to the plasma ion source, a temperature of the plasma, or a plasma torch position;
        dependent on the selected one or more operating conditions of the plasma ion source, automatically control a rotation speed of the interface vacuum pump to automatically maintain a predetermined value of the interface pressure between the first and second apertures of the expansion chamber;
        initially display the automatically controlled rotation speed of the interface vacuum pump and/or the automatically maintained interface pressure on the GUI in a first GUI mode;
        receive input, via the GUI to enter an override mode and set a particular rotation speed of the interface vacuum pump, provided via the GUI, and/or a particular interface pressure, provided via the GUI; and in the override mode, display on the GUI the particular rotation speed of the interface vacuum pump as set and/or the particular interface pressure as set.

4. The apparatus of claim 3, wherein:

the controller is further configured to receive a selection of one or more elements of interest to be mass analyzed by the mass spectrometer; and the automatically controlling the rotation speed and the interface pressure are also dependent on the selected one or more elements.

* * * * *